United States Patent
Tanaka et al.

(10) Patent No.: US 8,823,478 B2
(45) Date of Patent: Sep. 2, 2014

(54) RARE EARTH SINTERED MAGNET, METHOD FOR PRODUCING SAME, MOTOR AND AUTOMOBILE

(75) Inventors: Satoshi Tanaka, Tokyo (JP); Fumitaka Baba, Tokyo (JP); Makoto Iwasaki, Tokyo (JP); Chikara Ishizaka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/637,424

(22) PCT Filed: Mar. 28, 2011

(86) PCT No.: PCT/JP2011/057684
§ 371 (c)(1),
(2), (4) Date: Nov. 9, 2012

(87) PCT Pub. No.: WO2011/122577
PCT Pub. Date: Oct. 6, 2011

(65) Prior Publication Data
US 2013/0049910 A1    Feb. 28, 2013

(30) Foreign Application Priority Data
Mar. 30, 2010   (JP) ................. P2010-079249

(51) Int. Cl.
*H01F 7/02*    (2006.01)
(52) U.S. Cl.
USPC ................................ 335/302; 428/692.1
(58) Field of Classification Search
USPC ............................................... 335/302
See application file for complete search history.

(56) References Cited

U.S. PATENT DOCUMENTS

| | | | | |
|---|---|---|---|---|
| 4,898,625 | A | * | 2/1990 | Otsuka et al. ................. 148/101 |
| 5,641,363 | A | * | 6/1997 | Fukuno et al. ................. 148/104 |
| 5,834,663 | A | * | 11/1998 | Fukuno et al. ................... 75/244 |
| 6,340,857 | B2 | * | 1/2002 | Nishiyama et al. ...... 310/156.53 |
| 6,447,621 | B1 | * | 9/2002 | Tokoro et al. ................. 148/302 |
| 6,741,002 | B2 | * | 5/2004 | Nishiyama et al. ...... 310/156.53 |
| 7,018,485 | B2 | * | 3/2006 | Tsujimoto et al. ............ 148/101 |
| 7,201,810 | B2 | * | 4/2007 | Morimoto et al. ............ 148/302 |
| 7,622,010 | B2 | * | 11/2009 | Kuniyoshi et al. ............ 148/301 |
| 7,931,756 | B2 | * | 4/2011 | Kuniyoshi et al. ............ 148/105 |

(Continued)

FOREIGN PATENT DOCUMENTS

| | | |
|---|---|---|
| JP | 2005-11973 | 1/2005 |
| JP | 2006-210864 | 8/2006 |

(Continued)

*Primary Examiner* — Shawki S Ismail
*Assistant Examiner* — Lisa Homza
(74) *Attorney, Agent, or Firm* — Drinker Biddle & Reath LLP

(57) ABSTRACT

A rare earth sintered magnet 10 including a magnet body that includes a rare earth compound, and a protective layer on the magnet body, having a first layer and a second layer in that order from the magnet body side, wherein the surface portion of the magnet body has a higher heavy rare earth element content than the interior of the magnet body that is surrounded by the surface portion, the first layer includes a rare earth oxide, the mass ratio of the heavy rare earth element being 1 or greater with respect to the light rare earth element, and the second layer includes an oxide containing iron and/or boron which is different from the rare earth oxide, the second layer having a lower rare earth oxide content than the first layer.

4 Claims, 5 Drawing Sheets

(56) References Cited

U.S. PATENT DOCUMENTS

| | | | |
|---|---|---|---|
| 8,299,661 B2* | 10/2012 | Jeung | 310/51 |
| 8,500,921 B2* | 8/2013 | Ozeki et al. | 148/101 |
| 2005/0098238 A1* | 5/2005 | Morimoto et al. | 148/302 |
| 2005/0173025 A1* | 8/2005 | Iwasaki et al. | 148/103 |
| 2006/0213582 A1 | 9/2006 | Nakamura et al. | |
| 2006/0213583 A1 | 9/2006 | Nakamura et al. | |
| 2006/0213584 A1 | 9/2006 | Nakamura et al. | |
| 2006/0213585 A1 | 9/2006 | Nakamura et al. | |
| 2007/0034299 A1 | 2/2007 | Machida et al. | |
| 2008/0050581 A1 | 2/2008 | Miwa et al. | |
| 2008/0247898 A1 | 10/2008 | Nakamura et al. | |
| 2010/0021335 A1* | 1/2010 | Kuniyoshi et al. | 419/30 |
| 2010/0289366 A1* | 11/2010 | Komuro et al. | 310/156.01 |
| 2012/0112862 A1 | 5/2012 | Miwa et al. | |
| 2012/0139388 A1* | 6/2012 | Iwasaki et al. | 310/254.1 |
| 2013/0009503 A1* | 1/2013 | Iwasaki et al. | 310/152 |

FOREIGN PATENT DOCUMENTS

| | | |
|---|---|---|
| JP | 2006-303433 | 11/2006 |
| JP | 2006-303434 | 11/2006 |
| JP | 2006-303435 | 11/2006 |
| JP | 2006-303436 | 11/2006 |
| JP | 2007-329331 | 12/2007 |
| JP | 4029095 | 1/2008 |
| JP | 2008-135563 | 6/2008 |
| JP | 2008-147634 | 6/2008 |
| WO | 2005/096326 | 10/2005 |
| WO | 2008/120784 | 10/2008 |

* cited by examiner

RARE EARTH SINTERED MAGNET, METHOD FOR PRODUCING SAME, MOTOR AND AUTOMOBILE

TECHNICAL FIELD

The present invention relates to a rare earth sintered magnet and to a method for producing it, as well as to a motor comprising the rare earth sintered magnet and to an automobile comprising the motor.

BACKGROUND ART

Rare earth sintered magnets are relatively susceptible to corrosion, as a property of the rare earth compounds that are used as their main components. For this reason, covering layers are formed on rare earth sintered magnets to minimize the reduction in magnetic properties that occurs with corrosion. Such covering layers are made of various materials such as plating films or resin films, depending on the purpose of use and the desired properties of the rare earth sintered magnet.

For example, Patent document 1 proposes heat treatment of a rare earth sintered magnet to form an oxide protective layer on the surface, for improvement of the corrosion resistance of the rare earth sintered magnet.

CITATION LIST

Patent Literature

[Patent document 1] Japanese Patent No. 4029095

SUMMARY OF INVENTION

Technical Problem

Because of the excellent magnetic properties of rare earth sintered magnets, the use of rare earth sintered magnets is becoming ever more widespread. This is also leading to greater usage of rare earth sintered magnets used in harsh environments. This is creating a demand for rare earth sintered magnets with more excellent corrosion resistance than in the prior art.

The present invention has been accomplished in light of this situation, and its object is to provide a rare earth sintered magnet with high magnetic properties and excellent corrosion resistance. It is another object of the invention to provide a method for producing a rare earth sintered magnet with high magnetic properties and excellent corrosion resistance. It is yet another object of the invention to provide a motor and automobile that exhibit excellent reliability by comprising such a rare earth sintered magnet.

Solution to Problem

The present inventors have studied a variety of means of improving the magnetic properties and corrosion resistance of rare earth sintered magnets. It has been found, as a result, that it is effective to provide a protective layer comprising a plurality of layers with different compositions on a magnet body and to control the composition of the magnet body, and the invention has been completed upon this finding.

Specifically, the invention provides a rare earth sintered magnet comprising a magnet body that includes a rare earth compound, and a protective layer on the magnet body, having a first layer and a second layer in that order from the magnet body, wherein the surface portion of the magnet body has a higher heavy rare earth element content than the interior of the magnet body that is surrounded by the surface portion, the first layer comprises a rare earth oxide, the mass ratio of the heavy rare earth element being 1 or greater with respect to the light rare earth element, and the second layer comprises an oxide containing iron and/or boron which is different from the rare earth oxide, the second layer having a lower rare earth oxide content than the first layer.

The rare earth sintered magnet of the invention is provided with a first layer in which the content of the heavy rare earth element is higher than that of the light rare earth element, and the surface portion of the magnet body has a higher heavy rare earth element content than the interior. Since a heavy rare earth element is more resistant to corrosion than a light rare earth element, the assembly has more excellent corrosion resistance than a magnet body containing essentially no heavy rare earth element near the surface, or a rare earth sintered magnet provided with a layer composed mainly of a light rare earth element. Moreover, since the heavy rare earth element content in the surface portion of the magnet body is higher than the heavy rare earth element content in the interior of the magnet body, excellent adhesiveness is exhibited between the magnet body and the first layer. The excellent adhesiveness contributes to increased corrosion resistance. Excellent corrosion resistance is also exhibited because a second layer, having a lower rare earth oxide content than the first layer and comprising iron and/or boron, is provided on the outer side of the first layer.

The second layer in the rare earth sintered magnet of the invention preferably contains essentially no rare earth oxide. This can still further increase the corrosion resistance.

According to the invention there is further provided a method for producing a rare earth sintered magnet, comprising a diffusion step in which a heavy rare earth compound is adhered onto the surface of a magnet body including a rare earth compound and is heated so that the heavy rare earth element in the heavy rare earth compound is diffused through the surface portion of the magnet body while forming a covering layer comprising the heavy rare earth compound on the magnet body, a surface treatment step in which at least part of the surface portion of the covering layer is removed, and an oxidizing treatment step in which the covering layer is oxidized in an oxidizing atmosphere containing an oxidizing gas, to form a protective layer comprising, in order from the magnet body, a first layer comprising a rare earth oxide, the mass ratio of the heavy rare earth element being 1 or greater with respect to the light rare earth element, and a second layer comprising an oxide containing iron and/or boron and having a lower rare earth oxide content than the first layer.

According to this production method it is possible to form a protective layer composed of a two-layer structure with excellent corrosion resistance on a magnet body. The protective layer has a second layer with excellent corrosion resistance on the outer side, and a first layer with relatively excellent corrosion resistance on the inner side and also having a property of not easily peeling from the magnet body. The rare earth sintered magnet obtained by the production method therefore has excellent corrosion resistance.

In the diffusion step of the method for producing a rare earth sintered magnet according to the invention, the heavy rare earth compound-adhered magnet body is preferably heated to between 600° C. and 1000° C. Heating in this temperature range will inhibit deterioration of the magnet body while allowing adequate diffusion of the heavy rare earth element in the surface portion of the magnet body. This can minimize microcracks near the surface of the magnet caused by hydrogen generated during acid cleaning that is performed immediately before the film formation step, and can further improve adhesiveness between the magnet body and the protective layer (first layer).

In the surface treatment step of the method for producing a rare earth sintered magnet of the invention, at least part of the surface portion of the covering layer is removed to lower the arithmetic mean roughness Ra of the covering layer to no greater than 2 μm. This will facilitate formation of a second layer with a uniform thickness, so that even greater corrosion resistance can be achieved.

The heavy rare earth compound to be used in the surface treatment step of the method for producing a rare earth sintered magnet according to the invention is preferably a hydride of the heavy rare earth element. A heavy rare earth element hydride has a high heavy rare earth element mass ratio, and will therefore allow efficient diffusion of the heavy rare earth element on the surface portion of the magnet body. This will facilitate production of a rare earth sintered magnet having both high magnetic properties and an excellent protective layer.

According to the invention there is also provided a motor comprising the rare earth sintered magnet described above. Since the motor comprises a rare earth sintered magnet having the features mentioned above, the magnetic properties of the rare earth sintered magnet can be maintained for prolonged periods even when used in corrosive environments. Superior reliability will therefore be exhibited.

According to the invention there is provided an automobile comprising the aforementioned motor. The automobile has excellent reliability because it comprises a motor having the features described above.

Advantageous Effects of Invention

According to the invention it is possible to provide a rare earth sintered magnet with high magnetic properties and excellent corrosion resistance. It is also possible to provide a method for producing a rare earth sintered magnet with high magnetic properties and excellent corrosion resistance. It is also possible to provide a motor and automobile with excellent reliability, by comprising such a rare earth sintered magnet.

DESCRIPTION OF EMBODIMENTS

Figure 1:
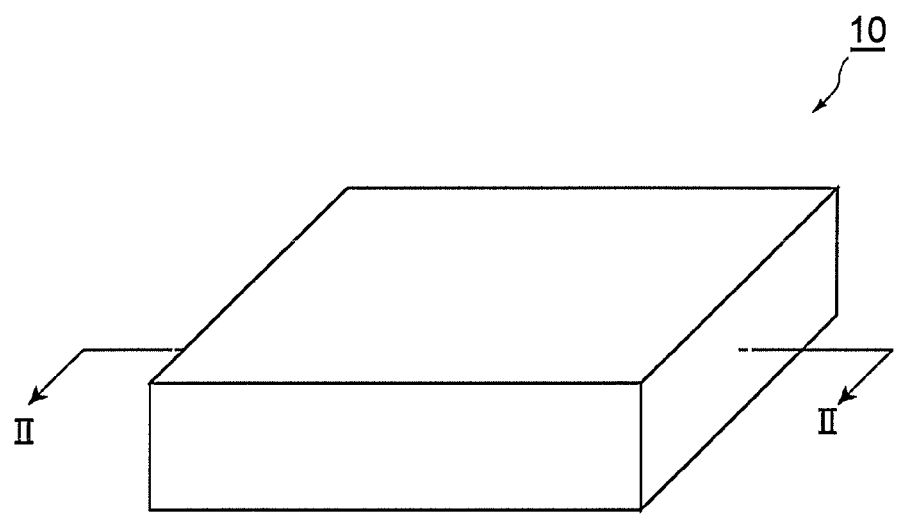
FIG. 1 is a schematic perspective view of an embodiment of a rare earth sintered magnet of the invention.

Preferred embodiments of the invention will now be explained with reference to the accompanying drawings where necessary. For the drawings, identical or corresponding elements will be referred to by like reference numerals and will be explained only once. Unless otherwise specified, the vertical and horizontal positional relationships are based on the positional relationships in the drawings. Also, the dimensional proportions depicted in the drawings are not necessarily limitative.

Figure 2:
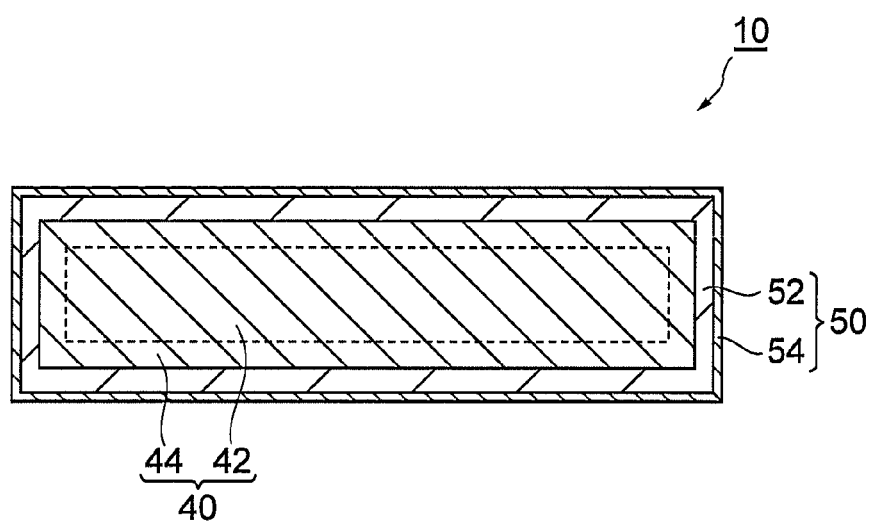
FIG. 2 is a cross-sectional view schematically showing an embodiment of a rare earth sintered magnet of the invention.

FIG. 1 is a schematic perspective view of an embodiment of a rare earth sintered magnet of this embodiment. FIG. 2 is a cross-sectional view along line II-II of the rare earth sintered magnet of FIG. 1. As seen in FIG. 1 and FIG. 2, the rare earth sintered magnet 10 of this embodiment has a magnet body 40, and a protective layer 50 covering the entire surface of the magnet body 40. The protective layer 50 has a first layer 52 and a second layer 54 with a different composition from the first layer 52, in that order from the magnet body 40 side. According to this embodiment, the second layer 54 is the outermost layer of the rare earth sintered magnet 10. Another layer such as a resin layer may also be provided on the second layer 54.

The magnet body 40 is a permanent magnet comprising, as the main component, a rare earth compound with a rare earth element. The rare earth element is at least one type of element selected from among scandium (Sc) and yttrium (Y), belonging to Group 3, and the lanthanoid elements, of the long Periodic Table. The lanthanoid elements include, for example, lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu).

The rare earth elements are classified as heavy rare earth elements ($R_H$) and light rare earth elements ($R_L$). The heavy rare earth elements include Gd, Tb, Dy, Ho, Er, Tm, Yb and Lu. The light rare earth elements, on the other hand, include La, Ce, Pr, Nd, Sm and Eu.

The rare earth compound, as the main component of the magnet body 40, may be a compound comprising the rare earth element and an element other than a rare earth element, as constituent elements. A rare earth compound preferably has at least one element selected from the group consisting of Nd, Sm, Dy, Pr, Ho and Tb as constituent elements. More preferably, it comprises these elements together with at least one element selected from the group consisting of La, Ce, Gd, Er, Eu, Tm, Yb and Y, as constituent elements.

Elements other than rare earth elements include transition elements and boron (B). The rare earth compound preferably comprises, as a transition element, at least one element selected from the group consisting of iron (Fe), cobalt (Co), titanium (Ti), vanadium (V), chromium (Cr), manganese (Mn), nickel (Ni), copper (Cu), zirconium (Zr), niobium (Nb), molybdenum (Mo), hafnium (Hf), tantalum (Ta) and tungsten (W), and more preferably Fe and/or Co. The rare earth compound may also include both a transition element and boron as constituent elements.

The magnet body 40 may also include, in addition to the rare earth compound, an element such as aluminum (Al), titanium (Ti), vanadium (V), chromium (Cr), manganese (Mn), bismuth (Bi), niobium (Nb), tantalum (Ta), molybdenum (Mo), tungsten (W), antimony (Sb), germanium (Ge), tin (Sn), zirconium (Zr), nickel (Ni), silicon (Si), gallium (Ga), copper (Cu) or hafnium (Hf), or a compound containing any of these elements.

The magnet body 40 may comprise an R-T-B based compound, for example, as the rare earth compound (rare earth alloy). In the case of an R-T-B based compound, R is a rare earth element preferably consisting mainly of Nd, and T is a transition metal element preferably consisting mainly of Fe and/or Co. A preferred R-T-B based compound is $R_2T_{14}B$.

The magnet body 40 may include a main phase with a tetragonal crystal structure composed of the R-T-B based compound (primarily a crystal phase), and at the grain boundary sections of the main phase, a rare earth-rich-phase with a high content ratio of the rare earth element and a boron-rich phase with a high boron atom content ratio. The rare earth-rich phase and the boron-rich phase are non-magnetic phases, without magnetism. The proportion of the main phase in the magnet body 40 is preferably 50 vol % or greater, more preferably 60 vol % or greater and even more preferably 70 vol % or greater. The particle size of the main phase is 1 to 100 µm, for example. A preferred R-T-B based compound is $R_2T_{14}B$.

The magnet body 40 has a higher mass ratio of the heavy rare earth element ($R_H$) in the surface portion 44 covering the interior 42, than in the interior 42 of the magnet body 40. For example, when the magnet body 40 comprises an R-T-B based compound as the rare earth compound, the amount of $R_H$ in solid solution in the compound and grain boundary phases is higher in the surface portion 44 than in the interior 42. Such a structure will increase adhesiveness between the magnet body 40 and the protective layer 50, so that a rare earth sintered magnet 10 having both high magnetic properties and corrosion resistance can be obtained.

The surface portion 44 of the magnet body 40 is a region with a depth of up to 100 µm, for example, from the surface of the magnet body 40, and the interior 42 is a region with a depth of greater than 100 µm from the surface of the magnet body 40. The interior 42 may be a region that comprises a light rare earth element as the rare earth element but contains essentially no heavy rare earth element. This will allow a rare earth sintered magnet 10 with high magnetic properties to be obtained at low cost. The phrase "contains essentially no" still allows for an amount that may be present as ordinary impurities. From the viewpoint of improving adhesiveness between the magnet body 40 and the protective layer 50, the mass ratio of the heavy rare earth element content in the surface portion 44 with respect to the interior 42 is preferably 3 or greater and more preferably 4 or greater.

The surface portion 44 has a higher heavy rare earth element content than the interior 42. The surface portion 44 preferably has a structure containing particles comprising an R-T-B based compound with a heavy rare earth element in solid solution as the main crystal phase (main phase), and comprising a heavy rare earth compound between the particles (grain boundary phase). The surface portion 44 does not need to contain essentially any light rare earth element, but preferably it includes an R-T-B based compound with both a light rare earth element and a heavy rare earth element in solid solution.

There are no restrictions on the proportion of the light rare earth element and heavy rare earth element in the surface portion 44, and for example, the molar ratio of $R_H$ to $R_L$ ($R_H/R_L$) is preferably 0.1-2 and more preferably 0.2-1. Such a range can reduce the amount of usage of costly heavy rare earth elements and further improve the magnetic properties and corrosion resistance. The proportion of $R_H$ with respect to the total rare earth element in the entire magnet body 40 is preferably 1-40 mass % and more preferably 1.5-30 mass %, from the viewpoint of improving the magnetic properties.

The composition of the magnet body 40 can be confirmed by a known analysis method such as EPMA (X-ray microanalysis), XPS (X-ray photoelectron spectroscopy), AES (auger electron spectroscopy) or EDS (energy dispersive fluorescent X-ray spectroscopy), of a cross-section of the magnet body 40, as shown in FIG. 2. The compositions of the surface portion 44 and interior 42 do not need to be uniform. For example, the surface portion 44 may have a higher heavy rare earth element content, present in solid solution in the main phase or grain boundary phase, further toward the surface of the magnet body 40. Such a structure will further increase adhesiveness between the magnet body 40 and the protective layer 50.

Figure 3:
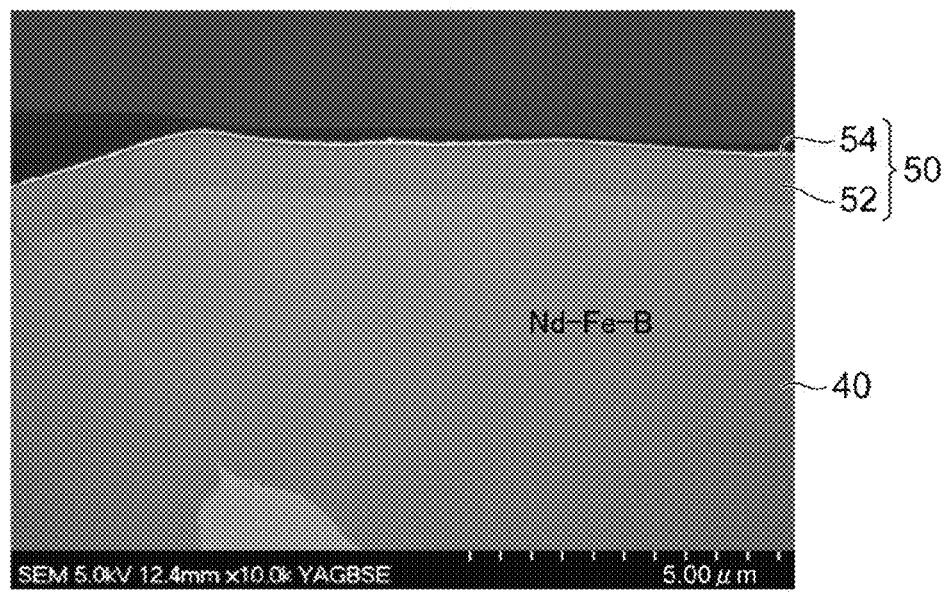
FIG. 3 is a scanning electron micrograph showing a magnified view of the region near the surface of the cross-section of the rare earth sintered magnet shown in FIG. 2.

FIG. 3 is a scanning electron micrograph (magnification: 10,000×) showing a magnified view of the region near the surface of a cross-section of a rare earth sintered magnet 10. The protective layer 50 is a layer provided on the surface of the magnet body 40, and it has a first layer 52 and a second layer 54 covering the entirety of the surface of the first layer 52, in that order from the magnet body 40 side. The first layer 52 has, as its main component, a rare earth oxide that contains a rare earth element and oxygen as constituent elements. The rare earth oxide may be one obtained by oxidation of an R-T-B based compound present in the magnet body 40. Specific rare earth oxides include $R_2O_3$, as well as complex oxides that contain T or B. The oxygen content of the first layer 52 is preferably 10-30 mass % and more preferably 15-25 mass %. The first layer 52 may comprise, in addition to the rare earth oxide, a small amount of an R-T-B based compound and a rare earth compound different from the R-T-B based compound.

In the first layer 52, the $R_H$ content is higher than the $R_L$ content. The mass ratio of $R_H$ with respect to $R_L$ in the first layer 52 is 1 or greater, preferably 1.5 or greater and more preferably 1.8 or greater. A first layer 52 of this type will exhibit higher corrosion resistance than a layer wherein the mass ratio of $R_H$ to $R_L$, is less than 1. It will also have more excellent adhesiveness with a magnet body 40 wherein the surface portion 44 has a higher $R_H$ content than the interior 42. That is, the corrosion resistance of the rare earth sintered magnet 10 can be improved by a synergistic effect, whereby the corrosion resistance of the $R_H$ itself is superior to that of the $R_L$, and the adhesiveness is improved.

The content ratio of the $R_H$ in the first layer 52 is preferably 5-10 mass %, more preferably 5-9 mass % and even more preferably 5-8 mass %. With $R_H$ present in this range, it will be possible to achieve high levels for both adhesiveness with the magnet body 40 and adhesiveness with the second layer 54. The first layer 52 may also contain $R_L$. From the viewpoint of obtaining both excellent corrosion resistance and high adhesiveness with the first layer 52 and the magnet body 40, however, the $R_L$ content is preferably less than 5 mass % and more preferably less than 4 mass %.

The thickness of the first layer 52 is preferably 0.5 to 20 µm and more preferably 1 to 10 µm. If the thickness of the first layer 52 is too large, the excellent magnetic properties of the rare earth sintered magnet 10 will tend to be impaired. If the thickness of the first layer 52 is too small, on the other hand, the corrosion resistance will tend to be more easily impaired in the presence of impacts.

The second layer 54 comprises an oxide containing iron and/or boron as a constituent element. The oxide is one that differs from the rare earth oxide in the first layer 52. The second layer 54 is a layer with a lower rare earth oxide content than the first layer 52. The second layer 54 preferably contains essentially no rare earth oxide, from the viewpoint of obtaining sufficiently high corrosion resistance for the rare earth sintered magnet 10. The phrase "contains essentially no" still allows for an amount that may be present as ordinary impurities.

The oxide containing iron and/or boron in the second layer 54 may be iron oxide, boron oxide, or the like. The second layer 54 preferably contains iron oxide as the main component. The content of oxygen element in the second layer 54 is preferably 20-40 mass %, and the content of iron element is preferably 60-80 mass %. The second layer may contain another non-metal element, such as nitrogen.

The thickness of the second layer 54 is preferably 0.05 to 1 μm and more preferably 0.08 to 0.5 μm. If the thickness of the second layer 54 is too large, the excellent magnetic properties of the rare earth sintered magnet 10 will tend to be impaired. If the thickness of the second layer 54 is too small, on the other hand, the corrosion resistance will tend to be more easily impaired in the presence of impacts.

The total thickness of the first layer 52 and second layer 54 is preferably 0.1 to 20 μm and more preferably 1 to 10 μm. The rare earth sintered magnet 10 may additionally have a separate layer between the first layer 52 and the second layer 54.

The content of each element in the first layer 52 and second layer 54 can be confirmed by a known analysis method such as EPMA (X-ray microanalysis), XPS (X-ray photoelectron spectroscopy), AES (auger electron spectroscopy) or EDS (energy dispersive fluorescent X-ray spectroscopy).

A preferred embodiment of the method for producing a rare earth sintered magnet according to the invention will now be explained, using the rare earth sintered magnet 10 as an example. The production method of this embodiment comprises:

(1) a preparation step in which a magnet body comprising a light rare earth compound is produced, (2) a diffusion step in which a heavy rare earth compound is adhered onto the surface of a magnet body and is heated so that the heavy rare earth element in the heavy rare earth compound is diffused throughout the surface portion of the magnet body while a covering layer comprising the heavy rare earth compound is formed on the surface of the magnet body, (3) a surface treatment step in which at least part of the surface portion of the covering layer is removed, and (4) an oxidizing treatment step in which the covering layer is oxidized in an oxidizing atmosphere containing an oxidizing gas, to form a protective layer on the magnet body, the protective layer comprising a first layer comprising a heavy rare earth compound, the mass ratio of the heavy rare earth element being 1 or greater with respect to the light rare earth element, and a second layer comprising an oxide containing iron and/or boron as a constituent element, and having a lower rare earth oxide content than the first layer. Each step will now be explained in detail.

In the preparation step, a magnet body comprising a light rare earth compound is prepared. The magnet body may be produced by powder metallurgy. Specifically, first an alloy having the desired composition is prepared by a known alloy production process such as casting or strip casting. Next, the alloy is ground to a particle size of 10 to 100 μm using a coarse grinder such as a jaw crusher, a brown mill or a stamp mill, and then further processed with a pulverizer such as a jet mill or attritor to a particle size of 0.5 to 5 μm. The obtained powder is molded in a magnetic field with a magnetic field intensity of preferably 600 kA/m or greater, at a pressure of 0.5 to 5 ton/cm$^2$ (approximately 49 to 490 MPa), to produce a compact.

The prepared compact is then preferably heated in an inert gas atmosphere or in a vacuum at 1000-1200° C. for 0.5 to 10 hours for sintering, and then quenched. The sintered compact is subjected to heat treatment in an inert gas atmosphere or in a vacuum at 500° C. to 900° C. for 1 to 5 hours (aging treatment), and if necessary the sintered compact is worked into a desired shape (working shape) to obtain a magnet body. The magnet body obtained in this manner may be further subjected to acid cleaning with nitric acid or the like.

In the diffusion step, the heavy rare earth element is diffused into the surface portion of the magnet body that has been prepared as described above, while forming a covering layer comprising the heavy rare earth compound on the surface of the magnet body. The heavy rare earth element source used may be a hydride or fluoride of the heavy rare earth element. From the viewpoint of accomplishing smooth diffusion of the heavy rare earth element in the magnet body, the heavy rare earth compound preferably contains a hydride of the heavy rare earth element. The heavy rare earth compound may be prepared by a known method.

The method of adhering the heavy rare earth compound onto the magnet body is not particularly restricted, and for example, it may be a method in which the magnet body is dipped into a slurry dispersing the powdered heavy rare earth compound, or a method in which a paste containing the powdered heavy rare earth compound is coated onto the surface of the magnet body. Of these methods, dipping the magnet body into a slurry dispersing the powdered heavy rare earth compound is preferred from the viewpoint of adhering the heavy rare earth compound onto the magnet body in as uniform a manner as possible.

The content of the heavy rare earth compound in the slurry is preferably 30-50 mass % and more preferably 35-45 mass %, from the viewpoint of a preferred range for the amount of heavy rare earth compound adhering to the magnet body 40. The mean particle size of the powder of the heavy rare earth compound to be dispersed in the slurry is preferably 0.1 to 50 μm and more preferably 0.1 to 10 μm. If the mean particle size is too large, the thickness of the covering layer formed on the magnet body will tend to vary more easily. The solvent used for the slurry may be an organic solvent such as alcohol or acetone. For the purpose of the invention, the mean particle size of the powder is the volume-average particle size measured using a commercially available laser diffraction particle size distribution meter.

The amount of heavy rare earth compound adhering to the magnet body is preferably 0.1 to 5 mass %, more preferably 0.2 to 3 mass % and even more preferably 0.3 to 2 mass %, as the heavy rare earth element with respect to the magnet body. If the amount of heavy rare earth element adhering to the magnet body is too great, variation in the thickness of the covering layer formed on the magnet body will tend to be greater. If the amount of heavy rare earth element adhering to the magnet body is too small, on the other hand, it will tend to be difficult to form a covering layer with adequate thickness.

After the heavy rare earth compound has adhered onto the magnet body, the heavy rare earth compound-adhered magnet body is heated in an inert gas atmosphere such as argon gas or nitrogen gas to diffuse the heavy rare earth element in the heavy rare earth compound throughout the surface portion 44 of the magnet body, while also forming a covering layer covering the magnet body. The heating temperature of the magnet body is preferably 600° C. to 1000° C. and more preferably 800° C. to 900° C. The heating time for the magnet body is preferably 0.5 to 10 hours, and more preferably 1 to 5 hours. If the heating temperature for the magnet body is too high, the magnet body will tend to deteriorate, making it difficult to obtain high magnetic properties. If the heating temperature for the magnet body is too low, on the other hand, the heavy rare earth element will tend to fail to diffuse sufficiently in the magnet body. As a result, the content of the heavy rare earth element that has low affinity for hydrogen will tend to be lower than the content of the light rare earth element near the surface of the magnet. Acid cleaning is carried out in the subsequent film formation step for cleaning of the magnet surface, but the hydrogen generated during this step reacts with the magnet body, forming microcracks and reducing adhesiveness of the magnet body and film. Therefore, when the heat treatment temperature is too low, resulting in insufficient diffusion of the heavy rare earth element, the number of microcracks tend to increase, making it difficult to obtain satisfactory adhesiveness with the magnet body.

These steps form a magnet body 40, having an interior 42 and a surface portion 44 surrounding the interior 42 and having a higher heavy rare earth element content than the interior 42, and a covering layer covering the magnet body 40. The covering layer has a thickness of 0.1 to 20 for example, and comprises a heavy rare earth compound. It may also comprise a light rare earth compound produced by the light rare earth element diffusing from the magnet body 40. The diffusion treatment may be followed by aging treatment in which the magnet body 40 is heated in an inert gas atmosphere or in a vacuum at 500° C. to 900° C. for 1 to 5 hours.

In the surface treatment step, at least part of the surface portion of the covering layer formed on the magnet body 40 is removed. This can smoothen the surface of the covering layer and allow formation of a protective layer composed of a two-layer structure in subsequent steps. The method of removing the surface portion of the covering layer may be a known method, such as barrel polishing, shot blasting or acid cleaning. For acid cleaning, it is preferred to use an aqueous nitric acid solution with a nitric acid concentration of about 1-5 mass %. The arithmetic mean roughness Ra of the covering layer after removal of the surface portion of the covering layer is preferably no greater than 2 µm and more preferably no greater than 1.5 µm. The maximum height Ry of the covering layer is preferably no greater than 15 µm and more preferably no greater than 10 µm. If Ra or Ry is too large, formation of the second layer will tend to be hampered.

In the oxidizing treatment step, the magnet body 40 with the covering layer is heated in an oxidizing atmosphere containing an oxidizing gas to oxidize the covering layer. This converts the covering layer to a protective layer 50 in which the first layer 52 and second layer 54 are laminated in that order from the magnet body 40 side. The thickness and composition of the first layer 52 and second layer 54 of the protective layer 50 can be adjusted by varying the oxidizing gas partial pressure, the treatment temperature and/or the treatment time.

The oxidizing atmosphere for the oxidizing treatment step is not particularly restricted so long as it is an atmosphere containing an oxidizing gas, and the atmosphere is one that promotes oxidation, such as air, an oxygen atmosphere or a water vapor atmosphere. The oxidizing gas used is not particularly restricted and may be oxygen or water vapor, for example. An oxygen atmosphere, for example, is an atmosphere with an oxygen concentration of at least 0.1%, and the atmosphere may also include an inert gas such as nitrogen in addition to oxygen. In other words, an oxygen atmosphere may also be an atmosphere comprising oxygen and an inert gas. A water vapor atmosphere, for example, is an atmosphere with a water vapor partial pressure of at least 1 kPa, and the atmosphere may also include an inert gas such as nitrogen in addition to water vapor. The water vapor atmosphere may be an atmosphere comprising water vapor and an inert gas. If the oxidizing atmosphere is a water vapor atmosphere, it will be possible to more easily form a protective layer 50. The oxidizing atmosphere may also be an atmosphere containing oxygen, water vapor and an inert gas.

The heating temperature for the oxidizing treatment step is preferably 200° C. to 550° C. and more preferably 250° C. to 500° C. If the heating temperature is above this upper limit, the magnetic properties will tend to be impaired. If the heating temperature is below the lower limit, on the other hand, it will tend to be difficult to form the second layer 54. The heating time is preferably between 1 minute and 10 hours.

The steps described above can produce a rare earth sintered magnet 10 having a magnet body 40 and a protective layer 50 with a two-layer structure covering the magnet body 40.

The rare earth sintered magnet 10 and a method for producing it were described above, but the rare earth sintered magnet of the invention and the method for producing it are not necessarily limited to this described embodiment. The rare earth sintered magnet 10 is also not limited to one obtained by the production method described above. For example, the heavy rare earth compound may be adhered onto a compact composed of the magnet body and heated to form the magnet body and the covering layer on the magnet body, with the same timing.

Figure 4:
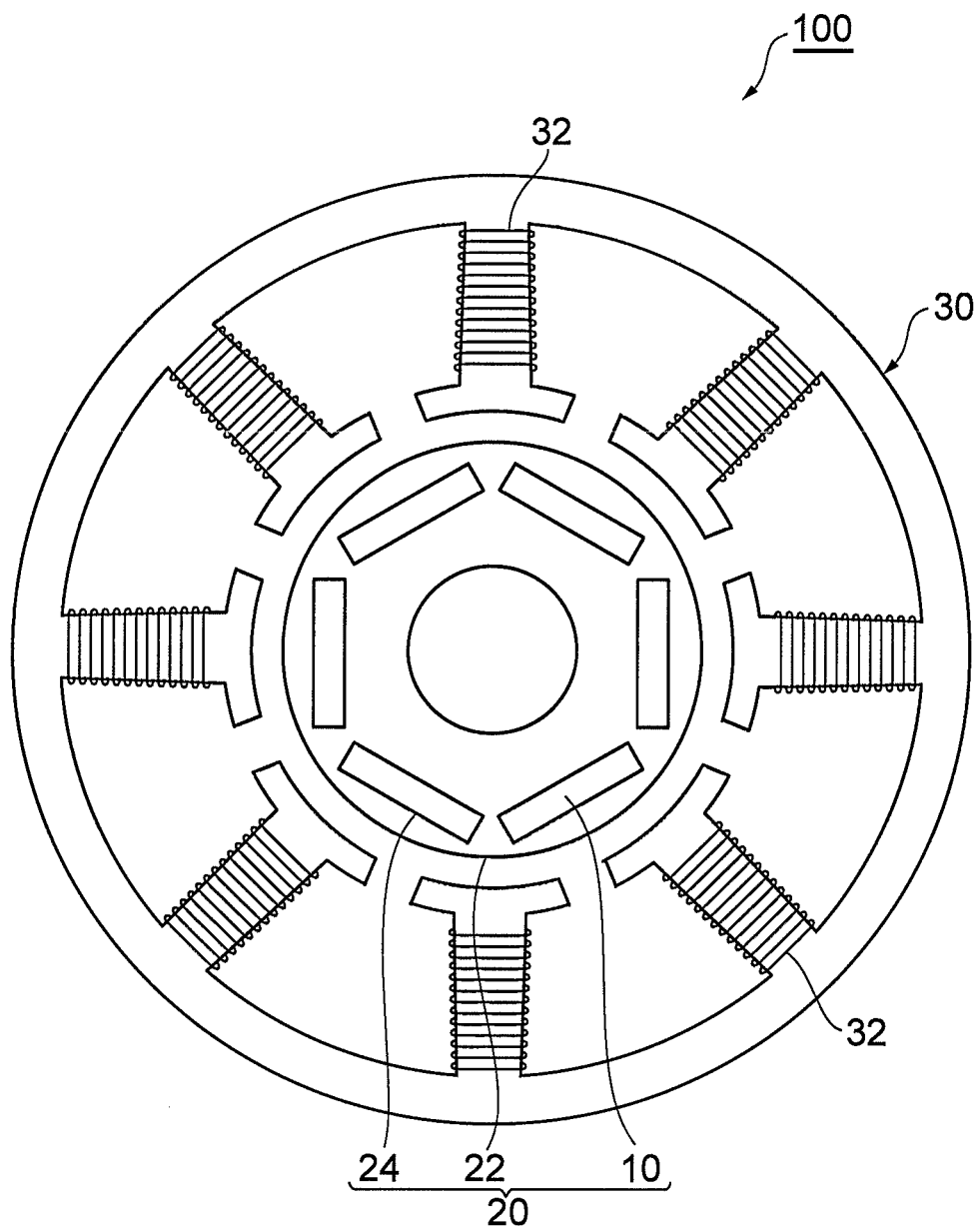
FIG. 4 is an illustration of the internal structure of an embodiment of a motor according to the invention.

A preferred embodiment of a motor according to the invention will now be explained. FIG. 4 is an illustration of the internal structure of an embodiment of a motor according to this embodiment. The motor 100 of this embodiment is a permanent magnet synchronous motor (IPM motor), comprising a cylindrical rotor 20 and a stator 30 situated on the outer side of the rotor 20. The rotor 20 has a cylindrical rotor core 22, a plurality of magnet holders 24 that serve to hold rare earth sintered magnets 10 at a prescribed spacing along the peripheral surface of the cylindrical rotor core 22, and a plurality of rare earth sintered magnets 10 held in the magnet holders 24.

The rare earth sintered magnets 10 adjacently provided along the circumferential direction of the rotor 20 are held in the magnet holders 24 with their N-poles and S-poles oriented in opposite directions to each other. With this configuration, the rare earth sintered magnets 10 that are adjacent along the circumferential direction generate magnetic lines of force in opposite directions along the radial direction of the rotor 20.

The stator 30 has a plurality of coils 32 provided at a prescribed spacing along the peripheral surface of the rotor 20. The coils 32 and rare earth sintered magnets 10 are arranged in a mutually opposing fashion. The stator 30 applies torque to the rotor 20 by electromagnetic action, and the rotor 20 rotates in the circumferential direction.

The IPM motor 100 comprises rare earth sintered magnets 10 according to the embodiment described above in the rotor 20. The rare earth sintered magnets 10 each have excellent magnetic properties and a plating film that does not easily peel. The IPM motor 100 therefore has excellent reliability. The IPM motor 100 can maintain high output for longer periods of time than the prior art. The IPM motor 100 can be produced by a common method using common motor parts, for the sections other than the rare earth sintered magnets 10.

The motor of the invention is not limited to an IPM motor, and may instead be an SPM, while it is also not limited to being a permanent magnet synchronous motor and may instead be a permanent magnet DC motor, linear synchronous motor, voice coil motor or vibrating motor.

Figure 5:
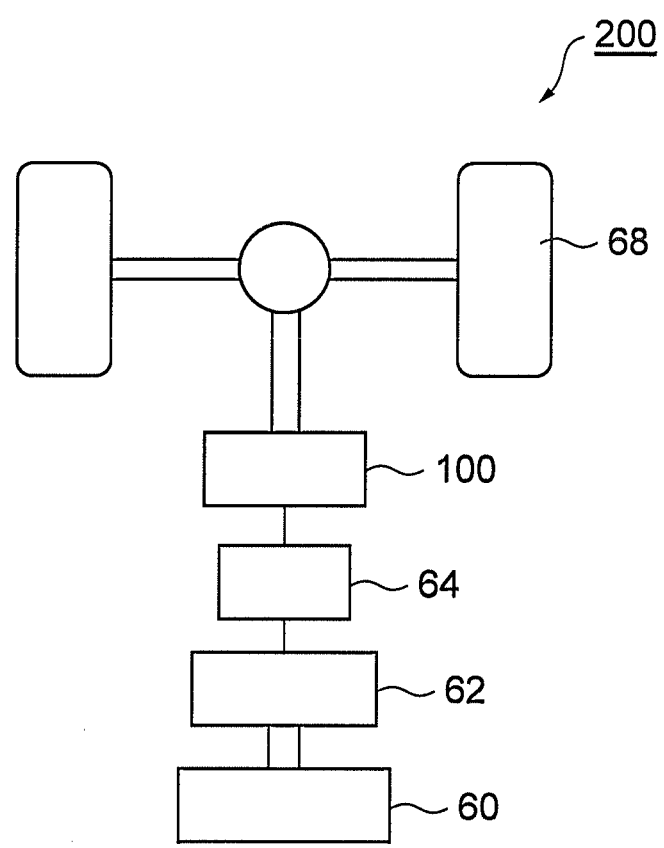
FIG. 5 is a conceptual drawing showing an embodiment of an automobile according to the invention.

FIG. 5 is a conceptual drawing showing the electric generating mechanism, storage mechanism and driving mechanism of an automobile as a preferred embodiment of the invention. The automobile 200 of this embodiment comprises the motor 100 of the embodiment described above, a wheel 68, a battery 64, a generator 62 and an engine 60.

The mechanical energy generated by the engine 60 is converted to electrical energy by the generator 62. The electrical energy is stored in the battery 64. The stored electrical energy is converted to mechanical energy by the motor 100. The mechanical energy from the motor 100 rotates the wheel 68 and drives the automobile 200. The automobile of the invention is not limited to the one shown in FIG. 5, incidentally.

EXAMPLES

The invention will now be explained in greater detail using examples and comparative examples, with the understanding that the invention is in no way limited to the examples.

Example 1

Preparation Step

Preparation of Magnet Body

Two starting alloys were prepared, a main phase alloy serving primarily to form the crystal grains (main phase) of the magnet body, and a grain boundary alloy serving primarily to form the grain boundaries (grain boundary phase) of the magnet body. The starting alloys were subjected to coarse grinding by hydrogen grinding and then jet mill grinding with high pressure $N_2$ gas to prepare fine powders A and B having mean particle sizes of 4 μm.

The fine powder A for the main phase alloy and the fine powder B for the grain boundary alloy that were prepared were mixed in a proportion of fine powder A:fine powder B=95:5, to prepare a starting powder for a magnet body. The starting powder was then used for molding in a magnetic field under conditions with a molding pressure of 1.2 ton/cm² (approximately 117.7 MPa) and an oriented magnetic field of 20 kOe, to obtain a rectangular solid compact (length×width×length=50 mm×33 mm×33 mm). The obtained compact was fired under conditions of 1060° C., 4 hours to obtain a magnet body (sintered compact) having the composition described above.

Nd: 24.50 mass %
Dy: 0.50 mass %
Pr: 5.30 mass %
Co: 0.45 mass %
Al: 0.18 mass %
Cu: 0.06 mass %
B: 1.00 mass %
Fe: Remainder (with <0.1 mass % unavoidable impurities.)

The obtained magnet body was cut to prescribed dimensions (20 mm×10 mm×2 mm), and then dipped for 3 minutes in an ethanol nitrate solution (nitric acid concentration: 3 mass %). Next, the magnet body was removed from the ethanol nitrate solution and subjected to ultrasonic cleaning in ethanol.

<Preparation of Heavy Rare Earth Compound>

A $DyH_2$ powder was prepared by the following procedure. A metal Dy mass was heated at 360° C. for 1 hour in a hydrogen atmosphere under atmospheric pressure, for storage of the hydrogen. The hydrogen-storing powder was subjected to heat treatment at 600° C. for 1 hour in an argon gas atmosphere under atmospheric pressure to obtain Dy hydride. The obtained Dy hydride was confirmed to be $DyH_2$ by X-ray diffraction.

The obtained $DyH_2$ was pulverized to a particle size of no greater than 100 μm using a stamp mill and then mixed with ethanol and subjected to wet grinding using a ball mill, to obtain a slurry containing $DyH_2$ powder with a mean particle size of 3 μm. Next, the slurry was diluted with ethanol to obtain a slurry with a solid content of 40 mass %.

<Diffusion Step>

The magnet body was dipped in the slurry with a solid content of 40 mass %. The sintered compact was then removed from the slurry and dried, to adhere the $DyH_2$ powder as a heavy rare earth compound on the surface of the magnet body. The $DyH_2$ powder coverage was 0.5 mass % as Dy based on the magnet body.

It was then subjected to heat treatment by heating in an argon gas atmosphere at 900° C. for 3 hours (heavy rare earth element diffusion treatment), to form a covering layer on the magnet body. The heavy rare earth element diffused throughout the surface portion of the magnet body during this step. The surface portion of the magnet body thus had a higher proportion of heavy rare earth element with respect to light rare earth element than the interior of the magnet body. It was then subjected to aging treatment by heating at 540° C. for 1 hour in an argon gas atmosphere under atmospheric pressure.

<Surface Treatment Step>

The surface of the covering layer formed on the magnet body was then subjected to barrel polishing to remove part of the surface portion of the covering layer for smoothing of the surface. The barrel polishing was accomplished by encapsulating the magnet body with the covering layer, a $ZrO_2$ media with a diameter of 10 mm and purified water in a ¼-inch diameter stainless steel ball mill pot, and rolling the stainless steel ball mill pot for 2 hours at a rotational speed of 108 rpm. The magnet body with the covering layer was then dipped for 2 minutes in an aqueous nitric acid solution with a nitric acid concentration of 3 mass %. The magnet body was subjected to ultrasonic washing.

<Oxidizing Treatment Step>

The magnet body with the covering layer was then heated for 10 minutes in a nitrogen gas atmosphere containing water vapor (water vapor partial pressure: 47.5 kPa), at 450° C. (oxidizing treatment). The oxidizing treatment converted the covering layer of the magnet body into a two-layer structure comprising a first layer and a second layer. These steps produced a rare earth sintered magnet for Example 1, comprising, on the magnet body, a protective layer with a first layer and a second layer in that order from the magnet body side.

<Compositional Analysis of Protective Layer and Magnet Body>

The obtained rare earth sintered magnet was cut using a focused ion beam processor, and the protective layer on the cut surface was observed with a field emission scanning electron microscope (FE-SEM). As a result, the protective layer was found to have a first layer and a second layer with different compositions, in that order from the magnet body side, the thicknesses of the first and second layers being 3 μm and 100 nm, respectively.

An EDS (Energy Dispersive fluorescent X-ray Spectrometer) was used for quantitation of the elements in the first and second layers. The results were as shown in Table 1. The first layer contained Dy, Nd, Fe and O, and the Dy content was higher than the Nd content. The second layer contained Fe and O, with no detectable Dy or Nd.

An electron beam microanalyzer (EPMA) was used to measure the heavy rare earth element content of the surface portion of the magnet body (at a 10 μm depth from the magnet body surface). The results were as shown in Table 1. In the interior of the magnet body (the region greater than a 100 μm depth from the surface of the magnet body), the heavy rare earth element content was unchanged from the initial magnet body content (0.5 mass %).

<Evaluation of Corrosion Resistance of Rare Earth Sintered Magnet>

The flux of the rare earth sintered magnet was measured (flux=A). A Pressure Cooker Test (PCT) was then carried out by the following procedure. Specifically, the rare earth sintered magnet was held for 300 hours in an environment of 120° C., 0.2 MPa, 100% RH. After holding, the flux of the rare earth sintered magnet was again measured (flux=B). The value of the demagnetizing factor=(A−B)/A×100 was calculated from the measured flux values. The results are shown in Table 1.

The prepared rare earth sintered magnet was magnetized, and the flux was subsequently measured. The rare earth sintered magnet was dipped in commercially available automatic transmission fluid (ATF) for a hybrid vehicle, containing 0.2 mass % added water, and held at 150° C. for 1000 hours (ATF dipping test). Next, the rare earth sintered magnet was removed from the ATF and remagnetized, and the flux was measured. The demagnetizing factor was determined in the same manner as the PCT, based on the flux values before and after the ATF dipping test. The results are shown in Table 1.

Example 2

A rare earth sintered magnet was prepared for Example 2 in the same manner as Example 1, except that in the diffusion step, $TbH_2$ powder was used instead of $DyH_2$ powder as the heavy rare earth compound powder to be adhered onto the surface of the magnet body. Compositional analysis of the protective layer and evaluation of the corrosion resistance of the rare earth sintered magnet were also carried out in the same manner as Example 1. The compositional analysis results and evaluation results are summarized in Table 1. The $TbH_2$ was prepared by the following procedure. A metal Tb mass was heated at 360° C. for 1 hour in a hydrogen atmosphere under atmospheric pressure, for storage of the hydrogen. It was then subjected to heat treatment by heating at 600° C. for 1 hour in an argon gas atmosphere under atmospheric pressure, to obtain $TbH_2$. The $TbH_2$ powder coverage on the magnet body was 0.5 mass % as Tb, based on the magnet body.

Example 3

A rare earth sintered magnet was prepared for Example 3 in the same manner as Example 1, except that in the diffusion step, $HoH_2$ powder was used instead of $DyH_2$ powder as the heavy rare earth compound powder to be adhered onto the surface of the magnet body. Compositional analysis of the protective layer and evaluation of the corrosion resistance of the rare earth sintered magnet were also carried out in the same manner as Example 1. The compositional analysis results and evaluation results are summarized in Table 1. The $HoH_2$ was prepared by the following procedure. A metal Ho mass was heated at 360° C. for 1 hour in a hydrogen atmosphere under atmospheric pressure, for storage of the hydrogen. It was then subjected to heat treatment by heating at 600° C. for 1 hour in an argon gas atmosphere under atmospheric pressure, to obtain $HoH_2$. The $HoH_2$ powder coverage on the magnet body was 0.5 mass % as Ho, based on the magnet body.

Example 4

A rare earth sintered magnet was prepared for Example 4 in the same manner as Example 1, except that in the diffusion step, $ErH_2$ powder was used instead of $DyH_2$ powder as the heavy rare earth compound powder to be adhered onto the surface of the magnet body. Compositional analysis of the protective layer and evaluation of the corrosion resistance of the rare earth sintered magnet were also carried out in the same manner as Example 1. The compositional analysis results and evaluation results are summarized in Table 1. The $ErH_2$ was prepared by the following procedure. A metal Er mass was heated at 360° C. for 1 hour in a hydrogen atmosphere under atmospheric pressure, for storage of the hydrogen. It was then subjected to heat treatment by heating at 600° C. for 1 hour in an argon gas atmosphere under atmospheric pressure, to obtain $ErH_2$. The $ErH_2$ powder coverage on the magnet body was 0.5 mass % as Er, based on the magnet body.

Example 5

A rare earth sintered magnet was prepared for Example 5 in the same manner as Example 1, except that in the diffusion step, $TmH_2$ powder was used instead of $DyH_2$ powder as the heavy rare earth compound powder to be adhered onto the surface of the magnet body. Compositional analysis of the protective layer and evaluation of the corrosion resistance of the rare earth sintered magnet were also carried out in the same manner as Example 1. The compositional analysis results and evaluation results are summarized in Table 1. The $TmH_2$ was prepared by the following procedure. A metal Tm mass was heated at 360° C. for 1 hour in a hydrogen atmosphere under atmospheric pressure, for storage of the hydrogen. It was then subjected to heat treatment by heating at 600° C. for 1 hour in an argon gas atmosphere under atmospheric pressure, to obtain $TmH_2$. The $TmH_2$ powder coverage on the magnet body was 0.5 mass % as Tm, based on the magnet body.

Example 6

A rare earth sintered magnet was prepared in the same manner as Example 1, except that in the oxidizing treatment step, oxidizing treatment of the magnet body was carried out by heating for 10 minutes at 290° C. in a mixed gas atmosphere of oxygen and nitrogen (oxygen concentration: 21 vol %), forming a protective layer on the surface of the magnet body. Compositional analysis of the protective layer and evaluation of the corrosion resistance of the rare earth sintered magnet were also carried out in the same manner as Example 1. The compositional analysis results and evaluation results are summarized in Table 1.

Examples 7 to 10

Rare earth sintered magnets for Examples 7 to 10 were prepared in the same manner as Examples 2 to 5, except that in the oxidizing treatment step, oxidizing treatment of the magnet body was carried out by heating for 10 minutes at 290° C. in a mixed gas atmosphere of oxygen and nitrogen (oxygen concentration: 21 vol %), forming a protective layer on the surface of the magnet body. Compositional analysis of the protective layer and evaluation of the corrosion resistance of the rare earth sintered magnet were also carried out in the same manner as Example 2 to 5. The compositional analysis results and evaluation results are summarized in Table 1.

Example 11

A rare earth sintered magnet for Example 11 was prepared in the same manner as Example 1, except that in the surface treatment step, no barrel polishing was carried out, and the dipping time of the magnet body in the aqueous nitric acid solution with a nitric acid concentration of 2 mass % was extended from 2 minutes to 4 minutes. That is, the surface treatment step was accomplished by acid cleaning alone. Compositional analysis of the protective layer and evaluation of the corrosion resistance of the rare earth sintered magnet were also carried out in the same manner as Example 1. The compositional analysis results and evaluation results are summarized in Table 1.

Example 12

A rare earth sintered magnet for Example 12 was prepared in the same manner as Example 1, except that in the surface treatment step, shot blasting was carried out instead of barrel polishing. Shot blasting was carried out for 10 seconds on one surface of the covering layer on the magnet body, using a shot blaster by Fuji Manufacturing Co., Ltd., with a set pressure of 0.3 MPa. Compositional analysis of the protective layer and evaluation of the corrosion resistance of the rare earth sintered magnet were also carried out in the same manner as Example 1. The compositional analysis results and evaluation results are summarized in Table 1.

Example 13

A rare earth sintered magnet was prepared for Example 13 in the same manner as Example 1, except that $DyF_3$ powder (mean particle size: 300 nm, product of Nippon Yttrium Co., Ltd.) was used instead of $DyH_2$ powder as the heavy rare earth compound powder to be adhered onto the surface of the magnet body. Compositional analysis of the protective layer and evaluation of the corrosion resistance of the rare earth sintered magnet were also carried out in the same manner as Example 1. The compositional analysis results and evaluation results are summarized in Table 1. The $DyF_3$ powder coverage on the magnet body was 0.5 mass % as Dy based on the magnet body.

Comparative Example 1

A rare earth sintered magnet was prepared for Comparative Example 1 in the same manner as Example 1, except that no diffusion step was carried out. That is, the magnet body obtained in the preparation step (sintered compact) was directly subjected to surface treatment, without using a heavy rare earth compound. Compositional analysis of the protective layer and evaluation of the corrosion resistance of the rare earth sintered magnet were also carried out in the same manner as Example 1. The compositional analysis results and evaluation results are summarized in Table 1.

Comparative Example 2

A rare earth sintered magnet was prepared for Comparative Example 2 in the same manner as Example 1, except that no barrel polishing of the magnet body was carried out. Compositional analysis of the protective layer and evaluation of the corrosion resistance of the rare earth sintered magnet were also carried out in the same manner as Example 2. The compositional analysis results and evaluation results are summarized in Table 1. The rare earth sintered magnet of Comparative Example 2 had no two-layer structure protective layer, and an island-shaped product had formed on the first layer. This is attributed to the lack of treatment such as barrel polishing, resulting in residue of the heavy rare earth compound powder on the surface of the covering layer, and irregularities on the surface of the covering layer.

TABLE 1

| | Heavy rare earth compound | Surface treatment conditions | Oxidation | Magnetic element $R_H$ (mass %) | First layer composition (mass %) | | | | $R_H/R_L$ | Second layer composition (mass %) | | | | Demagnetizing factor | |
|---|---|---|---|---|---|---|---|---|---|---|---|---|---|---|---|
| | | | | | $R_H$ | Nd | Fe | O | | $R_H$ | Nd | Fe | O | PCT | ATF |
| Example 1 | $DyH_2$ | A | Steam | 2.38 | 6.8% | 3.7% | 70.0% | 19.5% | 1.9 | — | — | 69.9% | 30.1% | 0.1% | 0.3% |
| Example 2 | $TbH_2$ | A | Steam | 2.44 | 7.5% | 3.5% | 72.2% | 16.8% | 2.1 | — | — | 69.7% | 30.3% | 0.1% | 0.5% |
| Example 3 | $HoH_2$ | A | Steam | 2.49 | 7.6% | 3.4% | 69.7% | 19.3% | 2.2 | — | — | 70.1% | 29.9% | 0.2% | 0.2% |
| Example 4 | $ErH_2$ | A | Steam | 2.46 | 6.6% | 3.9% | 71.0% | 18.5% | 1.7 | — | — | 68.9% | 31.1% | 0.2% | 0.2% |
| Example 5 | $TmH_2$ | A | Steam | 2.35 | 6.8% | 3.7% | 71.1% | 18.4% | 1.9 | — | — | 69.9% | 30.1% | 0.3% | 0.3% |
| Example 6 | $DyH_2$ | A | Oxygen | 2.39 | 7.1% | 3.6% | 69.1% | 20.2% | 1.9 | — | — | 69.9% | 30.1% | 0.0% | 0.4% |
| Example 7 | $TbH_2$ | A | Oxygen | 2.46 | 7.4% | 3.6% | 70.0% | 19.0% | 2.0 | — | — | 70.0% | 30.0% | 0.2% | 0.4% |
| Example 8 | $HoH_2$ | A | Oxygen | 2.41 | 6.5% | 3.3% | 72.3% | 17.9% | 1.9 | — | — | 69.5% | 30.5% | 0.2% | 0.1% |
| Example 9 | $ErH_2$ | A | Oxygen | 2.36 | 5.4% | 3.6% | 71.2% | 19.8% | 1.5 | — | — | 69.9% | 30.1% | 0.1% | 0.2% |
| Example 10 | $TmH_2$ | A | Oxygen | 2.40 | 6.4% | 3.6% | 69.9% | 20.1% | 1.8 | — | — | 69.6% | 30.4% | 0.2% | 0.5% |
| Example 11 | $DyH_2$ | B | Steam | 2.37 | 5.7% | 3.3% | 72.1% | 18.9% | 1.7 | — | — | 69.8% | 30.2% | 0.1% | 0.6% |
| Example 12 | $DyH_2$ | C | Steam | 2.38 | 5.9% | 3.1% | 71.5% | 19.5% | 1.9 | — | — | 70.1% | 29.9% | 0.2% | 0.2% |
| Example 13 | $DyF_3$ | A | Steam | 1.39 | 4.8% | 4.2% | 71.8% | 19.2% | 1.1 | — | — | 70.2% | 29.8% | 0.2% | 0.8% |
| Comp. Ex. 1 | Not used | A | Steam | 0.50 | 0.2% | 9.8% | 72.1% | 17.9% | 0.0 | — | — | 69.9% | 30.1% | 0.2% | 1.1% |
| Comp. Ex. 2 | $DyH_2$ | None | Steam | 2.53 | 7.4% | 3.2% | 70.1% | 19.4% | 2.3 | — | — | 70.3% | 29.7% | 0.2% | 1.3% |

In the Surface treatment step of the table, "A" represents barrel polishing, "B" represents acid cleaning, and "C" represents shot blasting.
In the table, the Magnetic element $R_H$ represents heavy rare earth element content in the surface portion of the magnet body.
In the table, "—" represents below the detection limit.
Since the second layer was not formed in the Comparative Example 2, the compositional analysis result of the island-shaped product formed on the first layer was shown in the column of the Second layer composition.

Examples 1 to 13 were confirmed to have a low demagnetizing factor in PCT and ATF tests, and excellent corrosion resistance.

<Evaluation of Surface Roughness and Adhesiveness>

During production of the rare earth sintered magnets of Examples 1, 11 and 12 and Comparative Examples 1 and 2, the surface roughness of the covering layer surfaces were measured before oxidizing treatment. Specifically, the arithmetic mean roughness Ra and the maximum height Ry were measured using a contact surface roughness meter by Mitsutoyo Corp., according to JIS B0601-1994 (Surface roughness—Definition and representation). The measurement results are shown in Table 2.

Next, the bonding strengths of the rare earth sintered magnets of Examples 1, 11 and 12 and Comparative Examples 1 and 2 were evaluated. Specifically, the rare earth sintered magnet was first bonded to a clean flat steel plate using an epoxy-based adhesive (trade name: SW2214 by 3M). It was then heated at 120° C. for 40 minutes to harden the adhesive and obtain a laminated body. A hand press was used to apply shear force, and the strength (bonding strength) was calculated from the load at the time of destruction of the laminated body (compressive shear test). The calculated results for the strength are shown in Table 2.

TABLE 2

| | Heavy rare earth compound | Surface treatment conditions | Surface roughness (μm) Ra | Surface roughness (μm) Ry | Adhesive strength (MPa) |
|---|---|---|---|---|---|
| Example 1 | $DyH_2$ | Barrel polishing | 0.98 | 7.4 | 37 |
| Example 11 | $DyH_2$ | Acid washing | 0.87 | 6.4 | 37 |
| Example 12 | $DyH_2$ | Shot blasting | 1.04 | 8.8 | 38 |
| Comp. Ex. 1 | Not used | Barrel polishing | 0.88 | 6.2 | 30 |
| Comp. Ex. 2 | $DyH_2$ | None | 2.69 | 24.7 | 39 |

Based on the results shown in Table 2, the surfaces of the covering layers after surface treatment during production of the rare earth sintered magnets of Examples 1, 11 and 12 had lower surface roughnesses, and were therefore confirmed to be smoothed. With Comparative Example 2, on the other hand, the surface roughness of the covering layer was increased. Presumably, therefore, a protective layer with a two-layer structure could not be formed even with oxidizing treatment.

In the adhesiveness evaluation, all of the laminated bodies were destroyed by peeling between the magnet body and the protective layer. Contrast between Example 1 and Comparative Example 1 confirmed that the adhesive force was increased due to a higher heavy rare earth element content in the surface portion of the magnet body.

INDUSTRIAL APPLICABILITY

According to the invention it is possible to provide a rare earth sintered magnet with high magnetic properties and excellent corrosion resistance. It is also possible to provide a method for producing a rare earth sintered magnet with high magnetic properties and excellent corrosion resistance. It is also possible to provide a motor and automobile with excellent reliability, by comprising such a rare earth sintered magnet.

EXPLANATION OF SYMBOLS

10: Rare earth sintered magnet, 20: rotor, 22: rotor core, 24: magnet holder, 30: stator, 32: coil, 40: magnet body, 42: interior, 44: surface portion, 50: protective layer, 52: first layer, 54: second layer, 60: engine, 62: generator, 64: battery, 68: wheel, 100: motor, 200: automobile.

The invention claimed is:
1. A rare earth sintered magnet comprising:
   a magnet body that includes a rare earth compound; and
   a protective layer on the magnet body, the protective layer having a first layer and a second layer in that order from the magnet body,
   wherein a surface portion of the magnet body has a higher heavy rare earth element content than a heavy rare earth element content of an interior portion of the magnet body, the interior portion surrounded by the surface portion,
   the first layer comprises a rare earth oxide having a heavy rare earth element and a light rare earth element, a mass ratio of the heavy rare earth element being 1 or greater as compared to the light rare earth element of the first layer,
   the second layer comprises an oxide containing at least one of iron boron which is different from the rare earth oxide, and
   the second layer has a lower rare earth oxide content than the first layer.
2. The rare earth sintered magnet according to claim 1, wherein the second layer contains essentially no rare earth oxide.
3. A motor comprising the rare earth sintered magnet according to claim 1.
4. An automobile comprising the motor according to claim 3.

* * * * *